(12) United States Patent
Schroeder et al.

(10) Patent No.: US 7,882,702 B2
(45) Date of Patent: *Feb. 8, 2011

(54) CONTROL SYSTEM TO MINIMIZE WHITE SMOKE USING VARIABLE NOZZLE TURBO

(75) Inventors: Jamison C Schroeder, Birmingham, MI (US); Jeffrey Johnson, Clarkston, MI (US); Paul W Kelley, Lake Orion, MI (US); James S Baumgartner, Rochester Hills, MI (US); Thomas L Bahensky, Plymouth, MI (US); Scott John Fletcher, Haslett, MI (US); Mark L DeJong, Ann Arbor, MI (US); Jose L DeLeon, Madison Heights, MI (US); Brent M Chamberlain, Madison Heights, MI (US)

(73) Assignee: GM Global Technology Operations, Inc.

( * ) Notice: Subject to any disclaimer, the term of this patent is extended or adjusted under 35 U.S.C. 154(b) by 1054 days.

This patent is subject to a terminal disclaimer.

(21) Appl. No.: 11/026,345

(22) Filed: Dec. 30, 2004

(65) Prior Publication Data

US 2006/0144044 A1    Jul. 6, 2006

(51) Int. Cl.
*F02D 23/00* (2006.01)
*F02B 33/44* (2006.01)
(52) U.S. Cl. ........................ 60/602; 60/605.1
(58) Field of Classification Search ........... 60/600–603, 60/605.2, 598; 123/305
See application file for complete search history.

(56) References Cited

U.S. PATENT DOCUMENTS

| 4,848,086 | A | * | 7/1989 | Inoue et al. ................. 60/602 |
| 5,123,246 | A | * | 6/1992 | Younessi et al. ............. 60/602 |
| 5,974,801 | A | * | 11/1999 | Houtz ........................ 60/602 |
| 6,055,810 | A | * | 5/2000 | Borland et al. ............... 60/600 |
| 6,272,859 | B1 | * | 8/2001 | Barnes et al. ................ 60/602 |
| 6,314,733 | B1 | * | 11/2001 | Fallahi et al. ................ 60/598 |
| 6,662,562 | B2 | * | 12/2003 | Engel et al. .................. 60/602 |
| 6,665,604 | B2 | * | 12/2003 | Arnold ....................... 60/602 |
| 6,681,573 | B2 | * | 1/2004 | Arnold ....................... 60/602 |
| 6,687,601 | B2 | * | 2/2004 | Bale et al. .................... 60/602 |
| 6,857,263 | B2 | * | 2/2005 | Gray et al. ................. 60/605.2 |
| 7,024,856 | B2 | * | 4/2006 | Ando et al. .................. 60/602 |
| 7,047,933 | B2 | * | 5/2006 | Gray, Jr. ..................... 123/305 |
| 7,110,876 | B2 | * | 9/2006 | Uchiyama et al. ........... 701/108 |
| 7,124,582 | B2 | * | 10/2006 | Kennedy ..................... 60/602 |

* cited by examiner

*Primary Examiner*—Thai Ba Trieu

(57) ABSTRACT

An engine system and method for operating an internal combustion engine includes a turbocharger that generates a boost to the engine. A coolant temperature of the engine is determined along with other based engine inputs and calculated values. A normal boost based on operating conditions of the engine is determined. A supplemental boost is determined based on the coolant temperature. An offset boost based on the normal boost and the supplemental boost is determined. An air output of the turbocharger is modified based on the offset boost. The supplemental boost increases combustion efficiency, which reduces white smoke exhaust.

20 Claims, 3 Drawing Sheets

US 7,882,702 B2

CONTROL SYSTEM TO MINIMIZE WHITE SMOKE USING VARIABLE NOZZLE TURBO

FIELD OF THE INVENTION

The present invention relates to vehicle control systems and more particularly to vehicle control systems for minimizing white smoke exhaust.

BACKGROUND OF THE INVENTION

Diesel engines typically have higher thermal efficiency and lower fuel consumption rates than gasoline engines due to the increased compression ratio of the diesel combustion process and the higher energy density of diesel fuel. Consequently, diesel engines have a higher thermal burn efficiency which leads to improved fuel economy as compared to gasoline engines with similar output.

Internal combustion engines combust an air and fuel mixture within cylinders of the engine to produce drive torque. Engines can include a turbocharger that increases torque output by delivering additional air into the cylinders. One traditional turbocharger includes a variable nozzle turbo (VNT). VNT's include vanes that can be adjusted to regulate the amount of air delivered through the VNT. The vane position ranges from a fully-open position to a fully-closed position. In the fully-open position, the VNT delivers a minimum amount of air to the engine. In the fully-closed position, the VNT delivers a maximum amount of air to the engine. The vanes can be positioned between the fully-open and fully-closed positions to provide an intermediate amount of air to the engine. A vane solenoid adjusts the vane position based on a vane control signal and a vane control sensor generates a vane position signal indicating the actual vane position.

Diesel engines often include a turbocharger for increased air flow to meet emission requirements and performance standards. Boost (increased air flow) is typically calibrated based on sensed parameters. Typical indicators for engine running conditions are intake manifold temperature, coolant temperature, engine rpm, fuel quantity and injection timing. In diesel engines with waste-gate turbochargers, the boost map is typically set up for normal (warm) engine running conditions. In instances where normal conditions do not apply such as cold/hot ambient conditions, certain engine controls such as injection timing would be adjusted with minimal impact.

In some instances, diesel engines may exhaust white smoke. Typically white smoke is generated when the engine temperature and charge air temperatures in the cylinders is cooler, thus causing inefficient combustion and fuel not to completely burn. The unburned fuel is then exhausted and may produce a rich fuel smell. In cold weather it is common to exhaust white smoke until the engine temperature reaches normal operating temperature.

SUMMARY OF THE INVENTION

An engine system and method for operating an internal combustion engine includes a turbocharger that generates a boost to the engine. A coolant temperature of the engine is determined. A normal boost based on operating conditions of the engine is determined. A supplemental boost is determined based on the coolant temperature. An offset boost based on the normal boost and the supplemental boost is determined. An air output of the turbocharger is modified based on the offset boost.

According to other features, the supplemental boost is further based on an RPM of the engine. In addition, the supplemental boost is further based on an intake air temperature and a manifold air flow through an intake manifold on the engine, and an injector timing of a fuel injection system associated with the engine.

According to still other features, a position of a plurality of vanes arranged on the turbocharger is determined. An actual boost supplied to the engine is determined. The supplemental boost is modified based on the actual boost and the offset boost.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the term boost refers to an amount of compressed air introduced into an engine by a supplemental forced induction system such as a turbocharger.

Figure 1:
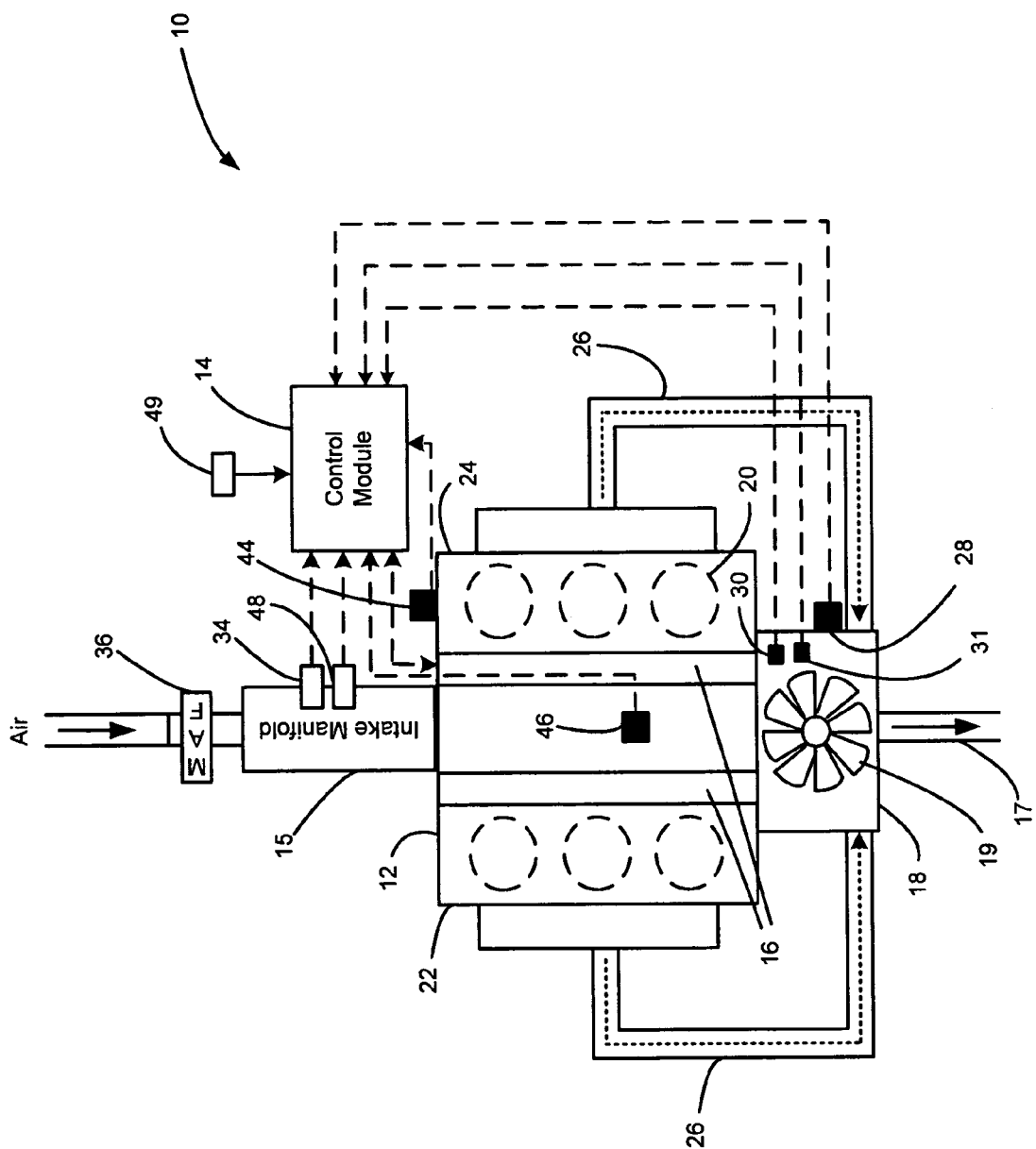
FIG. 1 is a functional block diagram of a VNT control system that reduces white smoke exhaust according to some implementations of the present invention.

Referring now to FIG. 1, an exemplary engine control system 10 is schematically illustrated in accordance with the present invention. The engine control system 10 includes an engine 12 and a control module 14. The engine 12 further includes an intake manifold 15, a fuel injection system 16, an exhaust system 17 and a turbocharger 18. The exemplary engine 12 includes six cylinders 20 configured in adjacent cylinder banks 22,24 in a V-type layout. Although FIG. 1 depicts six cylinders (N=6), it can be appreciated that the engine 12 may include additional or fewer cylinders 20. For example, engines having 2, 4, 5, 8, 10, 12 and 16 cylinders are contemplated. It is also anticipated that the engine 12 can have an inline-type cylinder configuration.

Air is drawn into the intake manifold 15 by the inlet vacuum created by the engine intake stroke. Air is drawn into the individual cylinders 20 from the intake manifold 15 and is compressed therein. Fuel is injected by the injection system 16 and is mixed with air. The air/fuel mixture is compressed and the heat of compression and/or electrical energy ignites the air/fuel mixture. Exhaust gas is exhausted from the cylinders 20 through exhaust conduits 26. The exhaust gas drives the turbocharger's turbine blades which in turn drives the turbocharger's compressor blades. The blades deliver additional air (boost) to the intake manifold 15 and into the cylinders 20 for combustion.

The turbocharger 18 is preferably a variable nozzle turbocharger (VNT). The turbocharger 18 includes a plurality of variable position vanes 19 that regulate the amount of air delivered from the vehicle exhaust 17 to the engine 12 based on a signal from the control module 14. More specifically, the vanes 19 are movable between a fully-open position and a fully-closed position. When the vanes 19 are in the fully-closed position, the turbocharger 18 delivers a maximum amount of air into the intake manifold 15 and consequently into the engine 12. When the vanes 19 are in the fully-open position, the turbocharger 18 delivers a minimum amount of air into the engine 12. The amount of delivered air is regulated by selectively positioning the vanes 19 between the fully-open and fully-closed positions.

The turbocharger 18 includes an electronic control vane solenoid 28 that manipulates a flow of hydraulic fluid to a vane actuator (not shown). The vane actuator controls the position of the vanes 19. A vane position sensor 30 generates a vane position signal based on the physical position of the vanes 19. A boost sensor 31 generates a boost signal based on the additional air delivered to the intake manifold 15 by the turbocharger 18. While the turbocharger implemented herein is described as a VNT, it is contemplated that other turbochargers employing electronic control methods may be employed.

A manifold absolute pressure (MAP) sensor 34 is located on the intake manifold 15 and provides a (MAP) signal based on the pressure in the intake manifold 15. A mass air flow (MAF) sensor 36 is located within an air inlet and provides a mass air flow (MAF) signal based on the mass of air flowing into the intake manifold 15. The control module 14 uses the MAF signal to determine the A/F ratio supplied to the engine 12. An RPM sensor 44 provides an engine speed signal. A coolant temperature sensor 46 provides a coolant temperature signal. An intake manifold temperature sensor 48 generates an intake air temperature signal. The control module 14 communicates an injector timing signal to the injection system 16. An accelerator pedal sensor 49 generates a pedal position signal that is output to the control module 14.

The control module 14 controls overall operation of the engine system 10. More specifically, the control module 14 controls engine system operation based on various parameters including, but not limited to, driver input, stability control and the like. The control module 14 can be provided as an Engine Control Module (ECM). The control module 14 regulates operation of the turbocharger 18 by regulating current to the vane solenoid 28. The control module 14 according to an embodiment of the present invention communicates with the vane solenoid 28 to provide an increased flow of air (boost) into the intake manifold 15. An increased flow of air causes the engine temperature to rise and therefore promote a favorable environment for combustion. As a result, white smoke exiting the vehicle 10 through the exhaust system 17 is reduced.

Figure 2A:
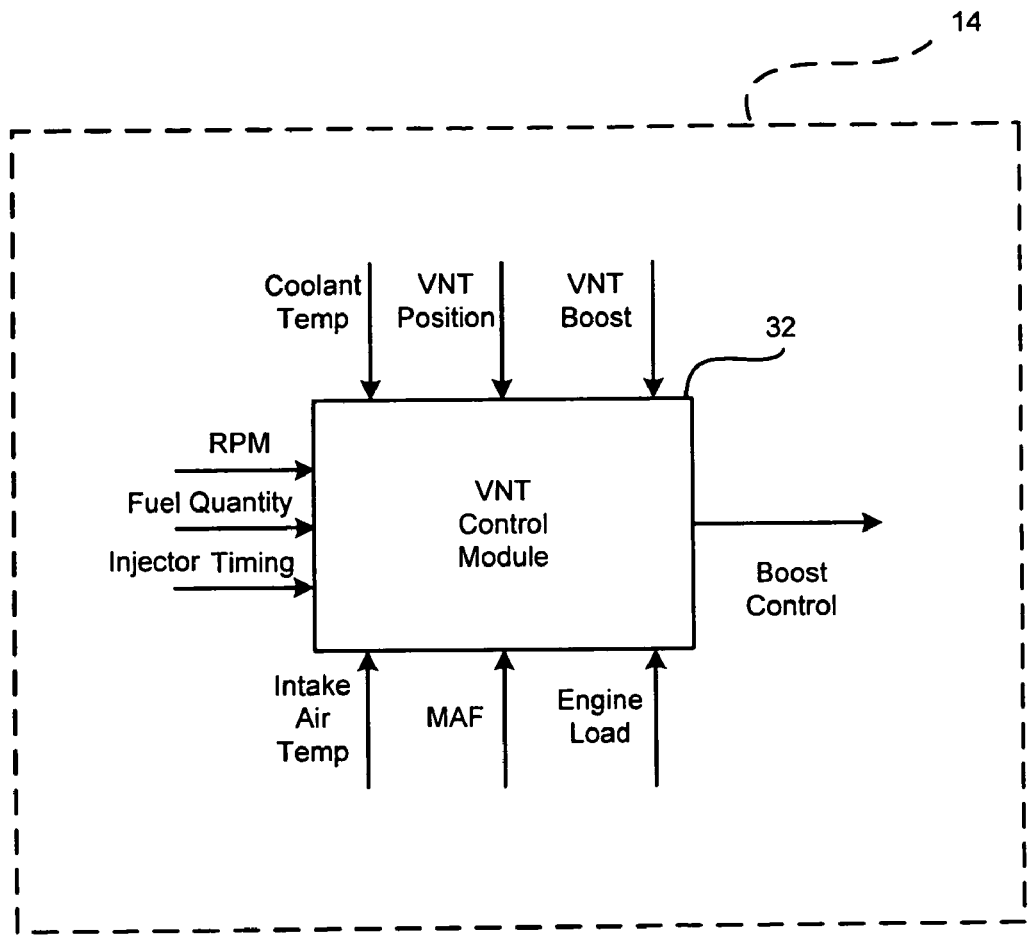
FIG. 2A is a logic diagram illustrating VNT control.
Figure 2B:
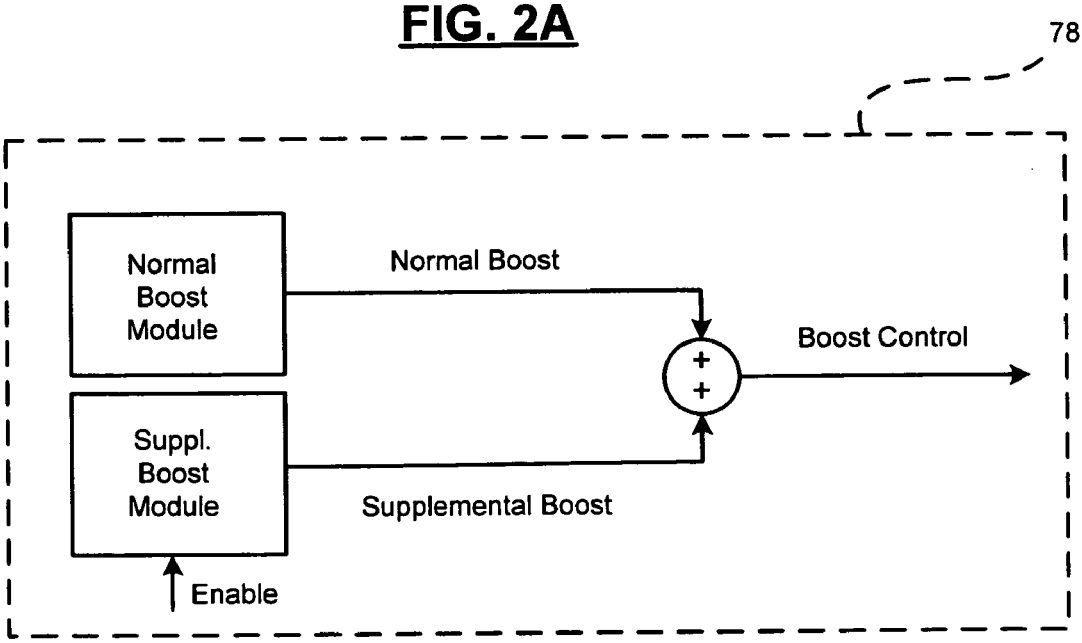
FIG. 2B is a logic diagram illustrating boost control according to some implementations of the present invention.
Figure 3:
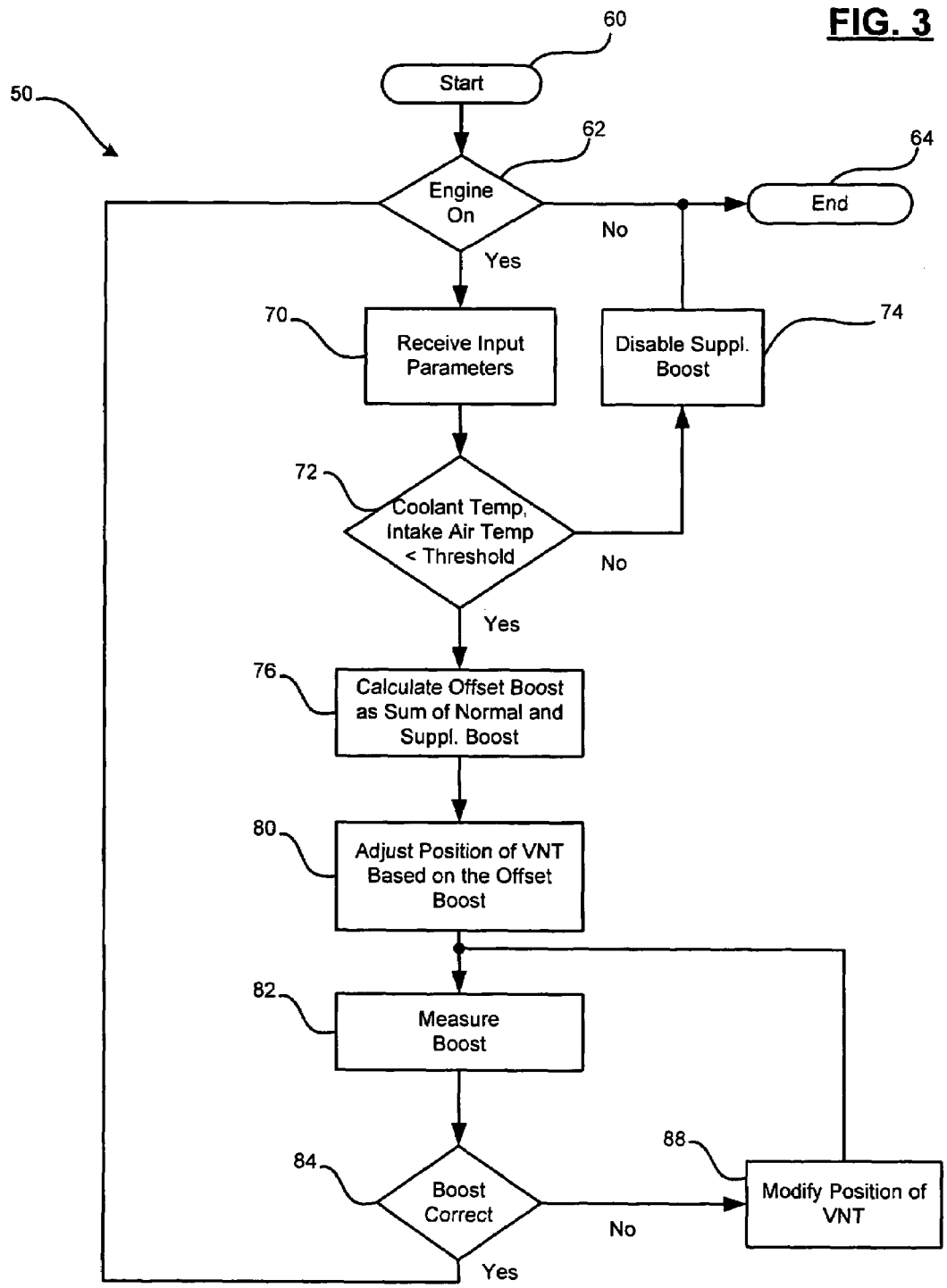
FIG. 3 is a flowchart showing steps for reducing white smoke exhaust according to some implementations of the present invention.

With reference now to FIGS. 2A–3, a method 50 for reducing white smoke according to an embodiment of the present invention will be described in further detail. As depicted in FIG. 2A, the control module 14 may include a standalone module or a VNT control module 32. Control begins in step 60. In step 62, control determines if the engine 12 is on. If the engine 12 is not on, control ends in step 64. If the engine is on, control receives input parameters in step 70. In step 70, control determines an intake air temperature based on the signal from the intake air temperature sensor 48. Control also determines a coolant temperature based on the signal from the coolant temperature sensor 46. Additionally, control determines a throttle request based on the signal from the pedal position sensor 49 for engine rpm and fuel quantity.

In step 72, control determines whether the measurements are within an acceptable range. For example, if at least one of the intake air temperature, the coolant temperature and/or the throttle request is above a calibration, control determines that increased boost with the VNT is unnecessary and control ends in step 64. In one implementation, control determines that increased boost is unnecessary for at least one of an intake air temperature and a coolant temperature above 25 degrees Celsius. If increased boost is unnecessary, control disables supplemental boost in step 74 and control ends in step 64. It is appreciated that additional measurements may be performed and included as necessary criteria for proceeding with the control method 50.

If the measurements are acceptable, control calculates an offset boost in step 76. An offset boost control module 78 is illustrated in FIG. 2B. The offset boost control module 78 generates an offset boost signal based on the sum of a normal boost and a supplemental boost. The supplemental boost is enabled based on an affirmative output in step 72. The normal boost represents the airflow injected into the intake manifold 15 by the turbocharger 18 based on normal operating conditions of the engine 12. The normal boost may be estimated based on engine speed (RPM), fuel injector timing, MAF, coolant temperature, intake air temperature and fuel quantity through a lookup table. The supplemental boost is the additional boost that is necessary to reduce white smoke exhausted through the exhaust 17. The supplemental boost may be estimated based on engine speed (RPM), fuel quantity, fuel injector timing, MAF, coolant temperature and intake air temperature through a lookup table. If control determines that the measurements are not acceptable, supplemental boost is disabled in step 74 and control ends in step 64.

In step 80, control performs the offset boost with the VNT 18. More specifically, the control module 14 communicates with the vane solenoid 28 to manipulate a flow of hydraulic fluid to the vane actuator based on the calculated offset boost. In step 82, control determines the offset boost supplied by the VNT 18. More specifically, control communicates with the position sensor and the boost sensor to determine an actual boost supplied at the intake manifold 15. In step 84, control determines if the actual boost supplied at the intake manifold 15 is correct based on the desired offset boost. If not, control modifies the signal communicated to the vane solenoid 28 in step 88. If the boost supplied at the intake manifold 15 is correct, control loops to step 70.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method for operating an internal combustion engine having a turbocharger that generates a boost to said engine, said method comprising:

determining a coolant temperature of said engine;

determining a normal boost based on operating conditions of said engine;

determining a supplemental boost based on said coolant temperature, said supplemental boost defined by a net increase in boost;

determining an offset boost based on said normal boost and said supplemental boost; and modifying an output of said turbocharger based on said offset boost.

2. The method of claim 1 wherein said supplemental boost is further based on an RPM of said engine.

3. The method of claim 2 wherein said supplemental boost is further based on an intake air temperature and a manifold air flow through an intake manifold on said engine.

4. The method of claim 3 wherein said supplemental boost is further based on an injector timing of a fuel injection system associated with said engine.

5. The method of claim 1 wherein modifying said output comprises:

determining a position of a plurality of vanes arranged on said turbocharger;

determining an actual boost supplied to said engine; and modifying said supplemental boost based on said actual boost and said offset boost.

6. The method of claim 5 wherein determining a position of a plurality of vanes include receiving a signal from a position sensor arranged on said turbocharger and wherein determining an actual boost includes receiving a signal from a boost sensor arranged on said turbocharger.

7. A method for operating an internal combustion engine having a turbocharger that generates a boost to said engine, said method comprising:

measuring engine parameters including determining a coolant temperature of said engine;

determining if a supplemental boost control is necessary based on said engine parameters;

determining a normal boost based on operating conditions of said engine;

determining a supplemental boost based on said coolant temperature, said supplemental boost defined by a net increase in boost;

determining an offset boost based on said normal boost and said supplemental boost; and modifying an output of said turbocharger based on said offset boost.

8. The method of claim 7 wherein measuring said engine parameters includes measuring an intake air temperature through an intake manifold of said engine and measuring a throttle request.

9. The method of claim 7 wherein determining if said supplemental boost control is necessary includes determining if said intake air temperature and said throttle request are outside a calibration.

10. The method of claim 7 wherein said supplemental boost is further based on an RPM of said engine.

11. The method of claim 10 wherein said supplemental boost is further based on an intake air temperature and a manifold air flow through an intake manifold on said engine and an injector timing of a fuel injection system associated with said engine.

12. A control system for controlling a variable nozzle turbo (VNT) for an engine, comprising:

a normal boost module that calculates a normal boost;

a supplemental boost module that calculates a supplemental boost defined by a net increase in boost;

an offset boost module that generates an offset boost signal for said VNT based on said normal boost and said supplemental boost; and a control module that adjusts VNT boost based on said offset boost signal.

13. The control system of claim 12 wherein said supplemental boost is based on a coolant temperature signal.

14. The control system of claim 13 wherein said supplemental boost is further based on an intake air temperature signal and a manifold air flow signal.

15. The control system of claim 14 wherein said supplemental boost is further based on an injector timing signal.

16. The control system of claim 15 wherein said supplemental boost is further based on a fuel quantity delivered to said engine and an RPM of said engine.

17. The control system of claim 16 wherein said control module determines if said supplemental boost output is correct based on a position sensor signal and a boost sensor signal from said turbocharger and wherein said controller modifies said supplemental boost based on said determination.

18. An engine system comprising the control system of claim 17 and further comprising a plurality of variable position vanes associated with said variable nozzle turbo that regulate an amount of air delivered to said engine.

19. The engine system of claim 18, further comprising a vane position sensor that generates said position sensor signal based on a physical position of said vanes.

20. The engine system of claim 19, further comprising a boost sensor that generates said boost sensor signal based on an amount of air delivered to said engine from said variable nozzle turbo.

* * * * *